US011923118B2

(12) United States Patent
Sato et al.

(10) Patent No.: US 11,923,118 B2
(45) Date of Patent: Mar. 5, 2024

(54) COIL COMPONENT AND METHOD OF MANUFACTURING COIL COMPONENT

(71) Applicant: Murata Manufacturing Co., Ltd., Kyoto-fu (JP)

(72) Inventors: Shuhei Sato, Nagaokakyo (JP); Yuki Kanbe, Nagaokakyo (JP); Hiroyuki Maso, Nagaokakyo (JP); Masaaki Fukuda, Nagaokakyo (JP)

(73) Assignee: Murata Manufacturing Co., Ltd., Kyoto-fu (JP)

( * ) Notice: Subject to any disclaimer, the term of this patent is extended or adjusted under 35 U.S.C. 154(b) by 512 days.

(21) Appl. No.: 17/064,369

(22) Filed: Oct. 6, 2020

(65) Prior Publication Data

US 2021/0104346 A1 Apr. 8, 2021

Related U.S. Application Data

(60) Provisional application No. 62/912,302, filed on Oct. 8, 2019.

(51) Int. Cl.
*H01F 17/04* (2006.01)
*H01F 27/28* (2006.01)
*H01F 27/29* (2006.01)

(52) U.S. Cl.
CPC ....... *H01F 17/045* (2013.01); *H01F 27/2823* (2013.01); *H01F 27/292* (2013.01)

(58) Field of Classification Search
CPC ... H01F 17/045; H01F 27/2823; H01F 27/292
See application file for complete search history.

(56) References Cited

U.S. PATENT DOCUMENTS 6,242,996 B1 * 6/2001 Sato ...................... H01F 17/045 336/200
11,367,553 B2 * 6/2022 Aoki ...................... B65H 75/18
2001/0038327 A1 * 11/2001 Aoki ...................... H01F 27/027 336/83
2003/0071704 A1 * 4/2003 Toi .......................... H01F 27/36 336/83
2006/0071749 A1 * 4/2006 Aoki ...................... H01F 17/045 336/83

(Continued)

FOREIGN PATENT DOCUMENTS

JP 2004363178 A * 12/2004
JP 2011223025 A * 11/2011
JP 2015-050373 A 3/2015

*Primary Examiner* — Bickey Dhakal
*Assistant Examiner* — Malcolm Barnes
(74) *Attorney, Agent, or Firm* — Studebaker & Brackett PC

(57) ABSTRACT

A coil component includes a drum core including a winding core portion extending in a first direction and a pair of flange portions provided at both ends of the winding core portion. At least one flange of the pair of flange portions has at least one step or gradient portion. A terminal electrode is provided on the step or gradient portion, and a wire is wound around the winding core portion with an end bonded to the terminal electrode. The terminal electrode includes plural metal layers, an outermost layer of which is an Sn film having a flattened mounting surface. The flattened mounting surface overlaps the step or gradient portion when seen in a second direction perpendicular to the first direction.

13 Claims, 9 Drawing Sheets

(56) References Cited

U.S. PATENT DOCUMENTS

| | | | | |
|---|---|---|---|---|
| 2007/0063804 | A1* | 3/2007 | Watanabe | H01F 3/10 336/83 |
| 2010/0219925 | A1* | 9/2010 | Yamamoto | H01F 41/041 29/606 |
| 2012/0133469 | A1* | 5/2012 | Tomonari | H01F 27/292 336/192 |
| 2014/0292465 | A1* | 10/2014 | Takagi | H01F 27/292 336/192 |
| 2015/0084731 | A1* | 3/2015 | Takagi | H01F 19/08 336/212 |
| 2016/0118183 | A1* | 4/2016 | Wada | H01F 27/292 336/192 |
| 2017/0140858 | A1* | 5/2017 | Takagi | H01F 27/306 |
| 2017/0316874 | A1* | 11/2017 | Igarashi | H01F 27/292 |
| 2017/0330676 | A1* | 11/2017 | Uchida | H01F 27/292 |
| 2017/0365399 | A1* | 12/2017 | Kobayashi | H01F 27/292 |
| 2018/0211763 | A1* | 7/2018 | Komaya | H01F 27/2828 |
| 2019/0080834 | A1* | 3/2019 | Someya | H01F 27/292 |
| 2019/0148063 | A1* | 5/2019 | Kim | H01F 27/34 361/56 |
| 2021/0065960 | A1* | 3/2021 | Shinohara | H01F 27/24 |

* cited by examiner

COIL COMPONENT AND METHOD OF MANUFACTURING COIL COMPONENT

CROSS-REFERENCE TO RELATED APPLICATION

This application is a non-provisional application of U.S. Provisional Application No. 62/912,302 filed Oct. 8, 2019, the entire content of which is incorporated herein by reference.

TECHNICAL FIELD

The present disclosure relates to a coil component and method of manufacturing a coil component.

BACKGROUND

Surface mount coil components are utilized in a variety of electronic devices. The coil components are mounted, often in high density, on a mounting substrate and should be mounted stably to provide robust and reliable bonding to the substrate.

FIG. 15 shows a known coil component 1 that is described in Japanese Application Laid Open No. JP2015050373A. As shown in FIG. 15, the coil component includes a drum core 2 having a winding core 3 around which a coil (not shown) is formed by winding a wire. Flanges 4A and 4B are positioned at respective ends of the winding core 3. Surfaces 5A and 5B of the flanges 4A and 4B each have a stepped profile on which terminal electrodes 6A and 6B are respectively provided. The terminal electrodes 6A and 6B each have an upper stage portion TB1 and lower stage portion TB2, where the upper stage portion TB1 is raised relative to the lower stage portion TB2 and is closer to the winding core 3 than the lower stage portion TB2. The coil component is mounted on a mounting substrate 7 via solder 8, whereas the lower stage portion TB2 is spaced from the mounting substrate such that it does not come in contact with the mounting substrate 7 during a mounting process.

SUMMARY

The inventors realized that with the coil component configuration disclosed in the above-described publication, the lower stage portion TB2 of terminal portion having the step profile is more spaced from the mounting substrate than the upper stage portion TB1 at the time of mounting the coil component onto the mounting substrate. This results in an area of Sn around the upper stage portion TB1 that is small relative to the ratio of the overall surface area TB1+TB2, and adversely affects the wettability of the solder. Accordingly, the inventors sought to improve upon the conventional coil component.

The present disclosure has been made in view of the above-described problem and is directed to a coil component including a drum core including a winding core portion extending in a first direction and a pair of flange portions provided at both ends of the winding core portion. At least one flange of the pair of flange portions has at least one step or gradient portion. A terminal electrode is provided on the step or gradient portion, and a wire is wound around the winding core portion with an end bonded to the terminal electrode. The terminal electrode includes plural metal layers, an outermost layer of which is an Sn film having a flattened mounting surface, and the flattened mounting surface overlaps the step or gradient portion when seen in a second direction perpendicular to the first direction.

A coil component according to another aspect of the present disclosure comprises a drum core including a winding core portion extending in a first direction and a first flange portion and a second flange portion provided at both ends of the winding core portion. The first flange portion has a first portion, a second portion and at least one step or gradient portion between the first portion and second portion. A terminal electrode is provided on the step or gradient portion of the first flange portion, and a wire wound around the winding core portion with first ends bonded to the terminal electrode. The terminal electrode includes plural metal layers, an outermost layer of which is an Sn film having a flattened mounting surface, and the flattened mounting surface overlaps the first portion, the second portion and the step or gradient portion when seen in a second direction perpendicular to the first direction.

Other features, elements, characteristics and advantages of the present disclosure will become more apparent from the following detailed description of preferred embodiments of the present disclosure with reference to the attached drawings.

DETAILED DESCRIPTION

Figure 1:
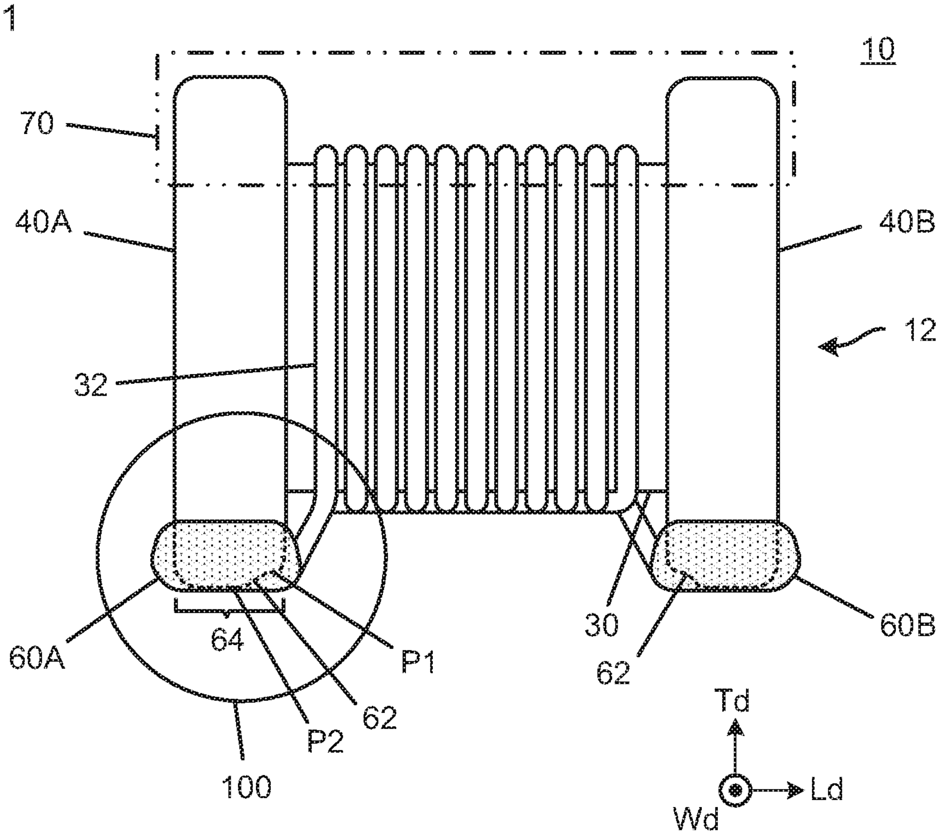
FIG. 1 is a front view of a coil component according to a first exemplary embodiment.
Figure 2:
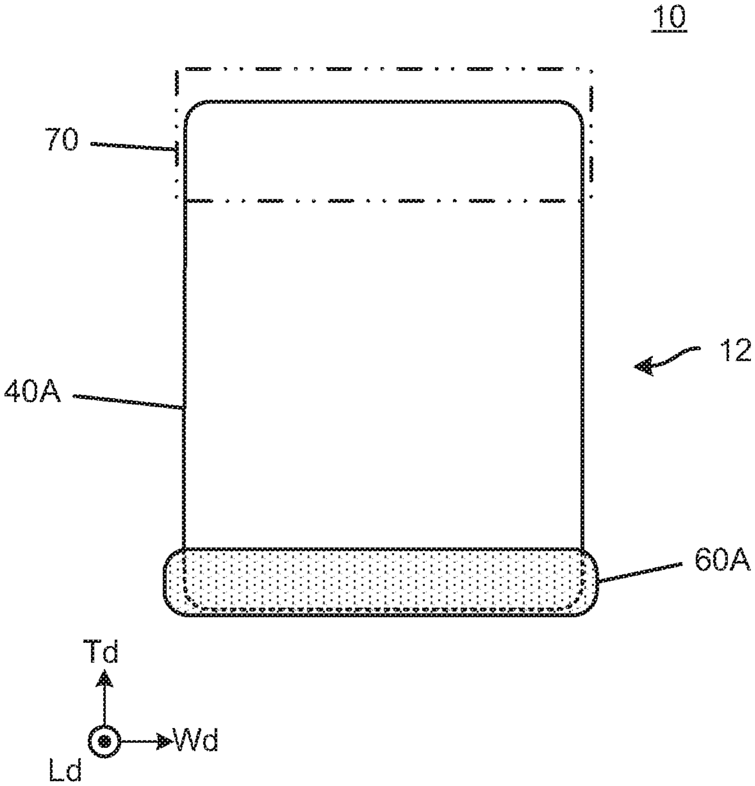
FIG. 2 is a side view of the coil component of FIG. 1.

A first exemplary embodiment of a coil component 10 according to the present disclosure will be described with reference to FIG. 1 to FIG. 4. As shown in FIG. 1, coil component 10 includes a drum core 12 and a planar core 70. The drum core 12 includes a winding core portion 30, which can have a substantially rectangular parallelepiped shape, and a pair of flange portions constituted by a first flange portion 40A and a second flange portion 40B positioned at respective ends of the winding core portion 30. The planar core 70 can be a coating resin or a magnetic material such as a ferrite board.

The first flange portions 40A includes at least one terminal electrode 60A, and the second flange portion 40B includes at least one terminal electrode 60B. A Cu wire 32 is wound around the winding core portion 30 to form a coil, and one terminal end of the coil is connected to terminal electrode 60A and another terminal end of the coil is connected to terminal electrode 60B. While not shown, winding core portion 30 can include plural coils and plural terminal electrodes on one or more of the flange portions.

The drum core 12 according to the first embodiment is made of a magnetic material, such as NiCuZn ferrite, although another magnetic material may be used. The drum core can be formed integrally (i.e., as one piece).

In the present disclosure, as illustrated in FIGS. 1 to 5C (and similarly illustrated in FIGS. 6 to 8 and FIGS. 10 to 14), a direction along a longitudinal axis of the winding core portion in which the first flange portion 40A and the second flange portion 40B are arranged side by side is defined as a length direction Ld. A direction that is perpendicular to a main surface of the planar core 70 and in which the planar core and each of the first flange portion 40A and second flange portion 40B of the drum core 12 are in contact with each other is defined as a height direction Td. A direction that is perpendicular to both the length direction Ld and the height direction Td is defined as a width direction Wd.

As shown in FIG. 1, each of the first flange portion 40A and second flange portion 40B of the drum core 12 of coil component 10 includes a step portion 62, and the terminal electrodes 60A and 60B are provided on the respective step portions of the first flange portions 40A and the second flange portion 40B.

In an exemplary embodiment of the present disclosure shown in FIG. 1, the coil component 10 includes a drum core 12 including a winding core portion 30 extending in a length direction Ld and a first flange portion 40A and a second flange portion 40B provided at both ends of the winding core portion 30. The first flange portion 40A has a first portion P1, a second portion P2, and at least one step or gradient portion 62 between the first portion P1 and the second portion P2. A terminal electrode 60A is provided on the step portion 62 of the first flange portion 40A, and a wire 32 wound around the winding core portion 30 with a first end bonded to the terminal electrode. The terminal electrode 60A includes plural metal layers, an outermost layer of which is an Sn film having a flattened mounting surface 64, and the flattened mounting surface overlaps the first portion P1, the second portion P2 and the step portion 62 when seen in a height direction Td perpendicular to the length direction Ld.

Figure 3:
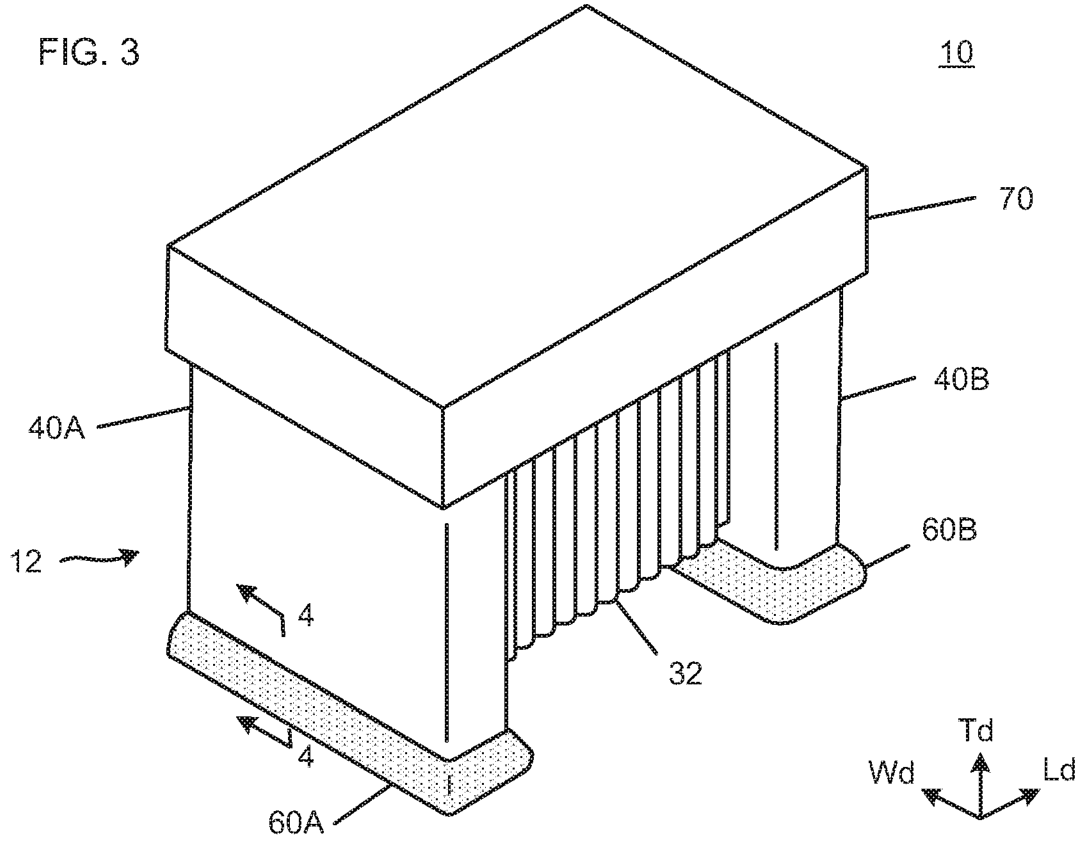
FIG. 3 is a perspective view of the coil component of FIG. 1.
Figure 4:
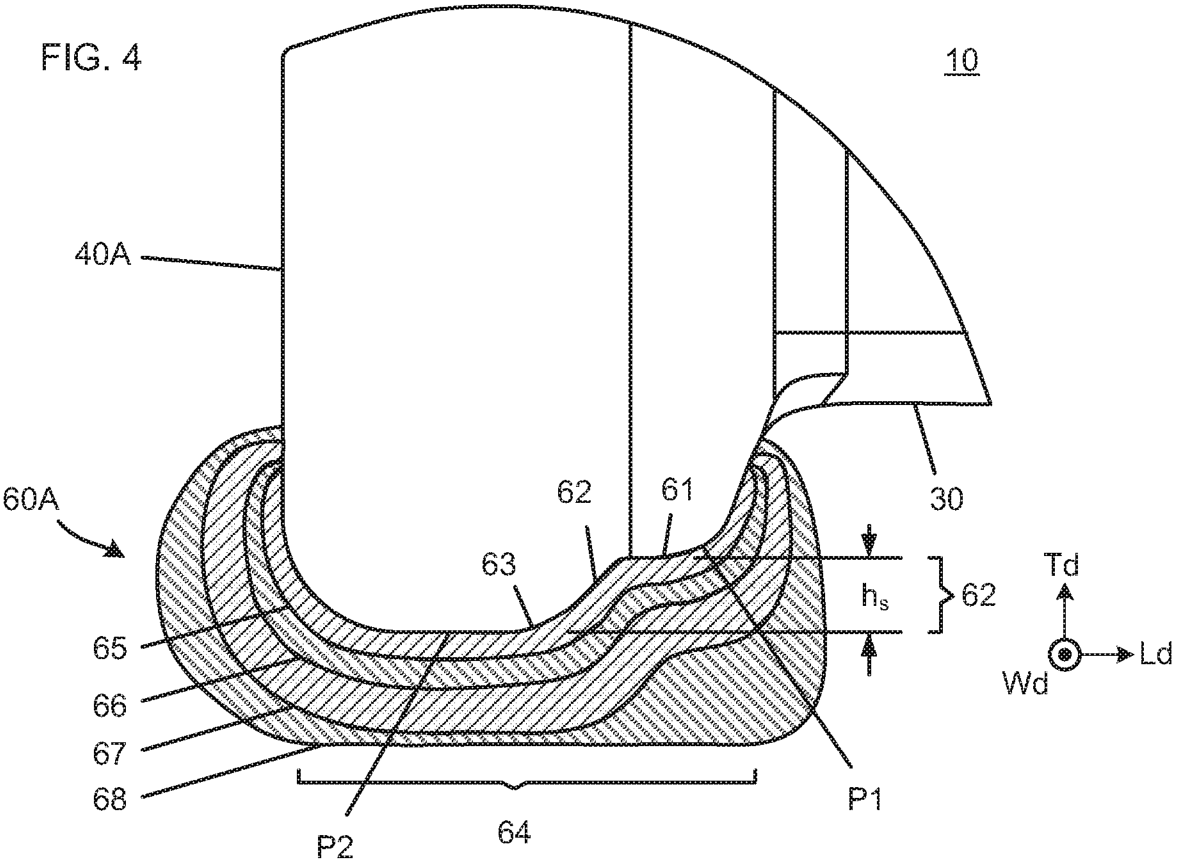
FIG. 4 is an enlarged cross sectional view of a circled portion 100 area of the coil component of FIG. 1.

FIG. 4 is a cross sectional view of a portion of drum core 12 including a portion of the flange 40A and winding core portion 30 within the circle 100 shown in FIG. 1 and as viewed along line 4-4 in FIG. 3. It is to be understood that flange portion 40B (not shown in FIG. 4) has a structure substantially identical to flange portion 40A, with an exception being that the winding core portion side of the flange 40B faces in the negative length direction Ld, as shown in FIG. 1.

With reference to FIG. 4, the step portion 62 of the first and second flange portions 40A and 40B has a step height $h_s$ in the height direction Td from a bottom portion to a top portion thereof. Terminal electrodes 60A and 60B are formed to cover sides of the first and second flange portions 40A and 40B including the step portions 62. Each terminal electrode 60A and 60B can include plural metal layers including an innermost Ag thick film 65, a Ni film 66, a Cu film 67, and an outermost Sn film 68. The outermost Sn film 68 has a flattened surface 64 that is configured to be solder mounted on a mounting surface.

The Sn film includes first portion that is relatively thin in the height direction Td and a second portion adjacent to the first portion and that is relatively thick in the height direction Td when compared with the first portion. Both the first and second portions of the Sn film 68 include portions of the flattened surface 64, and the step portion 62 overlaps with the second portion when seen in the height direction Td.

Each flange portion 40A and 40B includes a first curved portion 61 or inner curved portion just before the step portion 62 and a second curved portion 63 or outer curved portion after the step portion 62, as shown in FIG. 4. In other words, the first curved portion 61 and the second curved portion are provided, respectively, at the beginning and end of a step portion 62. Such planes formed before and after the step portion 62 facilitate the flattening of the Sn film 68.

The radius of curvature of the first curved portion 61 and the second curved portion 63 can be the same for ease of manufacturing or different for greater degree of design freedom. In this example, the first curved portion 61 has a radius of curvature of R0.02 mm, which is smaller than the radius of curvature of R0.03 mm of the second curved portion 63. With a greater radius of curvature for the inner curved portion compared with the outer curved portion, the bottom surface of the Sn film 68 tends to be flat. Further, the range of the step does not increase too much with a smaller outer curved surface.

Figure 5A:
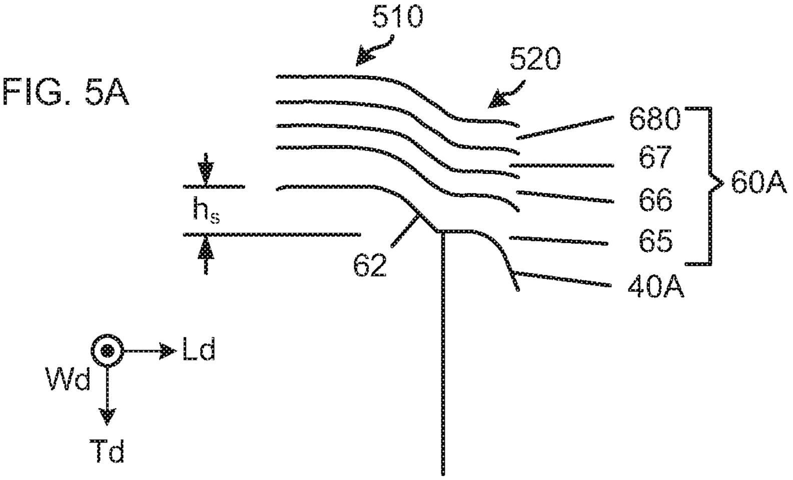
FIGS. 5A to 5D illustrate an exemplary method for manufacturing a coil component.
Figure 5B:
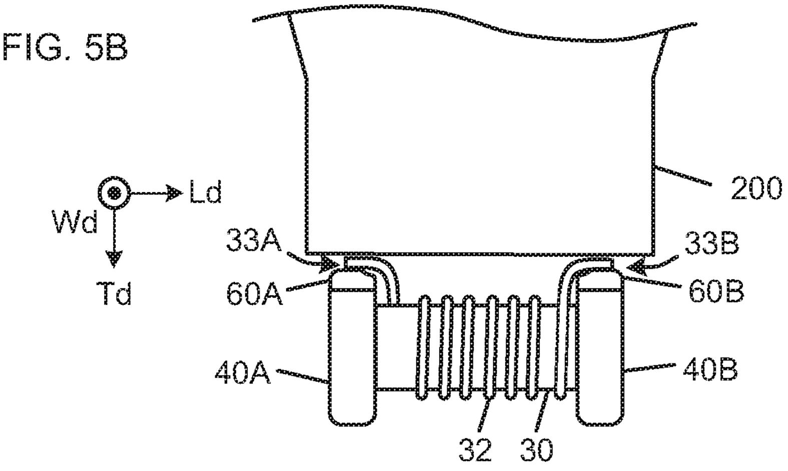
Figure 5C:
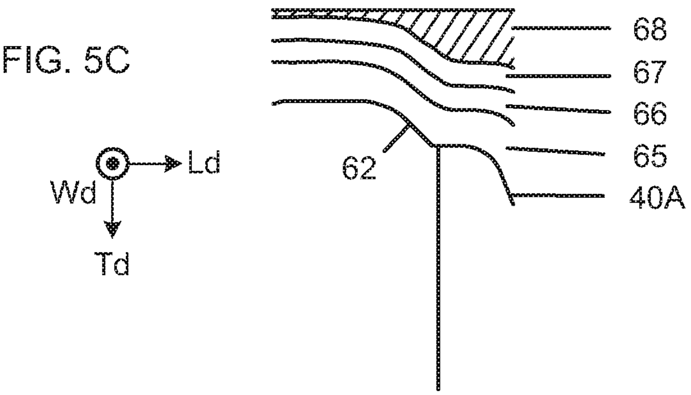

A process for creating the flattened surface 64 is illustrated in FIGS. 5A to 5D. While FIGS. 5A and 5C depict only the first flange portion 40A, it is to be understood that the same processes performed on the first flange portion 40A are performed on the second flange portion 40B.

First, side surfaces of the first flange portion 40A and second flange portion 40B are immersed in a container filled with the Ag paste resulting in the Ag paste being attached to each of the side surface. The side surfaces include the steps 62 of each of the first flange portion 40A and the second flange portion 40B. The attached Ag paste on the sides of the first and second flanges is dried and baked to form the Ag thick film 65 as a base electrode of the terminal electrodes 60A and 60B.

After forming the Ag thick films 65, the Ni film 66, the Cu film 66, and a Sn film 680 are successively formed on each Ag thick film 65, for example, by electroplating or the like. Each of the Ag/Ni/Cu/Sn films 65 to 67 and 680 have a step shape due to conforming with the underlying step portion 62. Thus, the electrodes 60A and 60B are respectively formed on the flange portions 40A and 40B of the core, as shown in FIG. 5A for the case of the first flange portion 40A.

As shown in FIG. 5B, the Sn film 680 formed in the above process is flattened by way of contact with a heater chip 200 in a thermo-compression bonding process. However, it is to be understood that other methods can be selected to flatten the Sn films.

Prior to the thermo-compression bonding process, a wire 32 is wound around the winding core portion 30 to form a coil and both of terminal sections of the coil (wire 32) are pulled outward to be located above the outermost Sn films 680 of the respective terminal electrodes 60A and 60B. The heater chip 200 loads and heats these portions of the wire 32 and the terminal electrodes 60A and 60B to create a thermo-compression bond. During thermo-compression bonding, terminal sections 33*a* and 33*b* of the coil are sandwiched between the heater chip 200 and the respective electrodes 60A and 60B having the Ag/Ni/Cu/Sn films, and thereafter are pressed by press-contact force of the heater chip 200. Conditions for thermo-compression bonding include a Cu wire diameter of less than or equal to 20 μm, a load of 200 gf, and a temperature around 500° C.

As shown in FIGS. 5A to 5C, during thermos-compression bonding, heater chip 200 has an appropriate shape and/or appropriate heating temperature that melts step shaped Sn film 680 of the terminal electrode 60A. During this process, both an upper step portion 510 and a lower step portion 520 of the Sn film 680 are melted, and the melted Sn film of the upper step portion 510 is extruded by the force of the heater chip 200 and spreads to the lower step portion 520, as shown in FIG. 5C. As a result, surfaces of the Sn film 680 of the first and second terminal electrodes 60A and 60B are flattened to form respective Sn films 68 having flattened surfaces 64. The Ni film 66 and the Cu film 67 retain a step shape after the flattening of Sn film 680.

It is preferable that the Sn film 680 has a thickness of ½ or more of the height $h_s$ of the step because the surfaces of such flattened Sn films 68 tend to be more flat than with a lesser thickness.

It is preferable that a step height $h_s$ of the first and second flange portions 40A and 40B is equal to or less than 40 μm to sufficiently flatten the Sn film, and thus also the overall shapes of terminal electrodes 60A and 60B. The shapes of terminal electrodes 60A and 60B might not be rendered sufficiently flat using a step height $h_s$ greater than 40 μm.

Figure 5D:
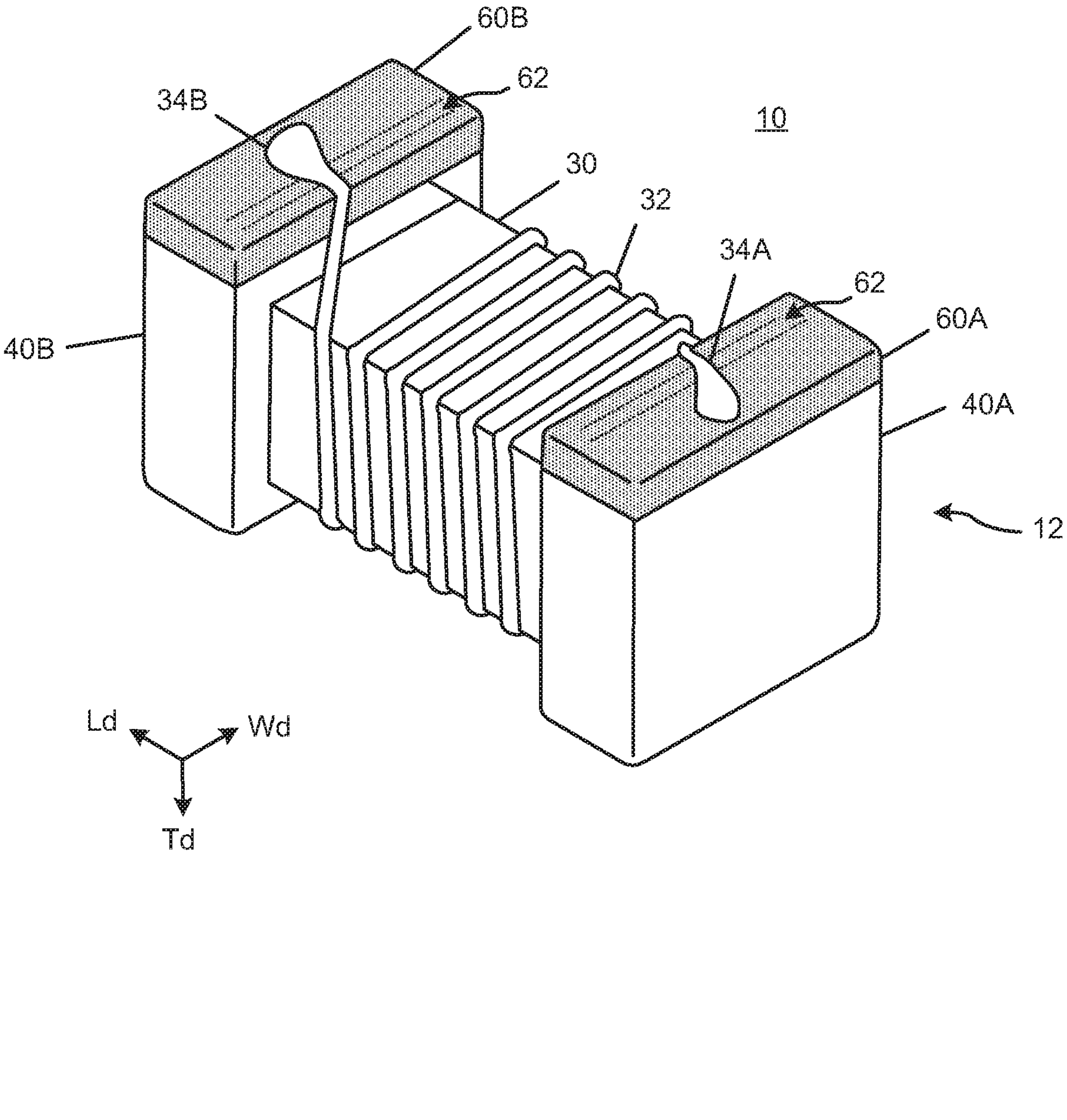

FIG. 5D shows a perspective view of the coil component 10 showing the bottom portions of the winding core portion 30, the first flange portion 40A, and the second flange portion 40B. A first end portion 34A at the terminal section 33*a* a second end portion 34B at the terminal section 33*a* of the Cu wire 32 are each pressed and then extended (stretched) along the length direction Ld and become embedded into Sn film of the respective terminal electrodes 60A and 60B, and part of the end portions 34A and 34B of the Cu wire 32 is exposed from the surface of Sn film.

Figure 6:
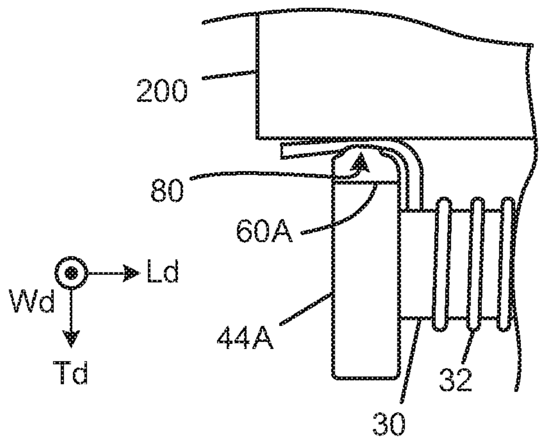
FIG. 6 illustrates an exemplary process of removing or cutting excess coil wiring.

FIG. 6 illustrates crimping wire 32 during thermo-compression bonding. As shown in FIG. 6, because the drum core flange has a step shape and flat area of the flange is shortened at area 80 (press-contact area is reduced), force is concentrated in reduced press-contact area 80. Accordingly, it is possible to reliably and easily cut/tear off and remove the unnecessary section of the wire after thermo-compression bonding. As a result, embodiments according to the present disclosure are able to inhibit the generation of burr when the wire is cut.

Figure 7:
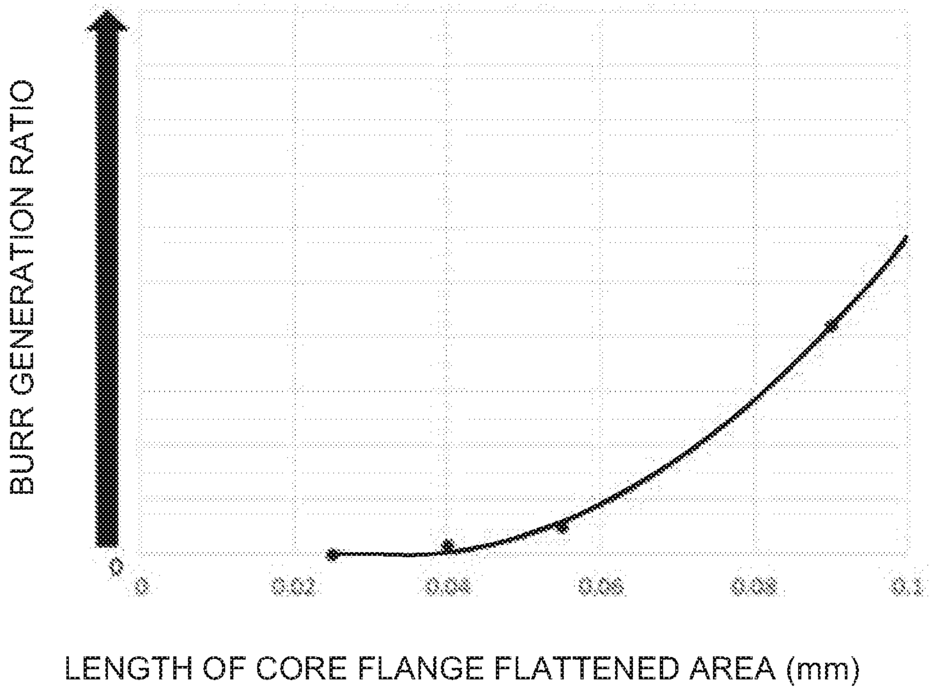
FIG. 7 is a graph illustrating a relationship between burr generation ratio and a length of a core flange flattened area.

FIG. 7 is a graph illustrating a relationship between the length of the flattened area and burr generation ratio. As can be seen from FIG. 7, burr generation is minimized when the flattened surface 64 is less than or equal to 40 μm, and preferably less than or equal to 30 μm. The burr generation ratio is less than 0.1% when the length of core flange flattened area is less than or equal to 0.04 mm. The burr generation ratio is 0% when the length of core flange flattened area is less than or equal to 0.03 mm.

A coil component according to the present disclosure lowers incidence of burrs at the time of wire cutting. Accordingly, crimp quality is improved. Additionally, at the time of mounting, a coil component according to the present disclosure is stabilized because outer surfaces of the terminal electrodes are flattened to increase contact area despite there being a difference in height due to the step. Thus, a coil component according to the present disclosure can be mounted stably on a mounting substrate, and solder wettability with respect to the terminal electrodes is enhanced.

The bottom portion of the Sn film 68 tends to be more flat when the width of the flattened surface 64 is ½ or greater than the total width of the flange portion 40A in the length direction Ld. It is therefore preferable that the width of the flattened surface 64 is ½ or greater than the width of the flange portion.

Figure 8:
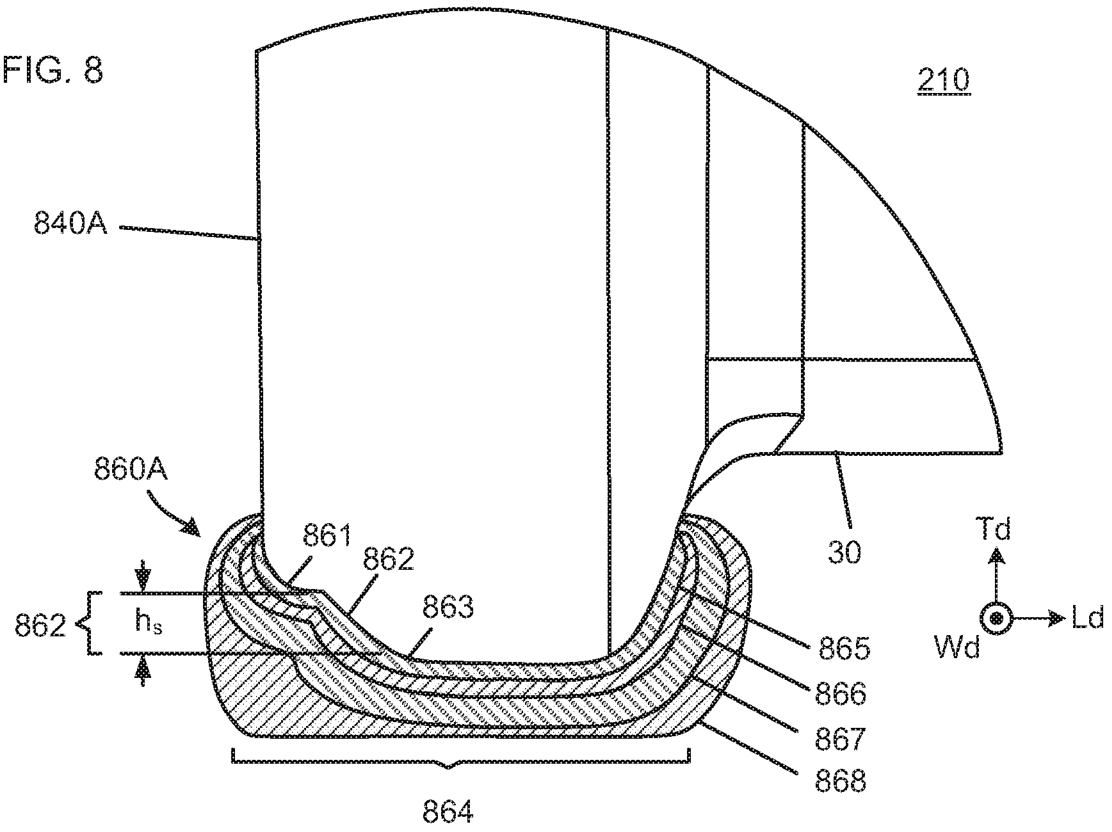
FIG. 8 is an enlarged cross sectional view of a portion of a coil component according to a second exemplary embodiment.

FIG. 8 is a diagram of a cross sectional view of a core portion of a coil component 210 according to a second exemplary embodiment. The portion of the core shown in FIG. 8 corresponds to the same area 100 of the drum core 12 shown in FIG. 1 and as viewed along the line 4-4 in FIG. 3, but has a step configuration different from that of the FIG. 1 embodiment.

More particularly, as shown in FIG. 8, a step portion 862 is positioned on a side of a flange portion 840A opposite to the winding core portion 30. While not shown, it is to be understood that coil component 210 includes another flange portion having a structure substantially identical to flange portion 840A at the other end of the winding core 30 but facing in the negative length direction Ld.

With reference to FIG. 8, flange portion 840A includes the step portion 862 having a step height $h_s$ in the height direction Td from a bottom portion to a top portion thereof. A terminal electrode 860A is formed to cover sides of the flange portion 840A including the step portion 862. The terminal electrode 860A includes plural metal layers including an innermost Ag thick film 865, a Ni film 866, a Cu film 867, and an outermost Sn film 868. The outermost Sn film 868 has a flattened surface 864 that is configured to be solder mounted on a mounting surface.

The Sn film 868 includes a first portion that is relatively thin in the height direction Td and a second portion positioned adjacent to the first portion and relatively thick in the height direction Td compared with the first portion. Both the first and second portions of the Sn film 868 include portions of the flattened surface 864, and the step portion 862 overlaps with the second portion of the Sn film 868 when seen in the height direction Td.

The flange portion 840A includes a first curved portion 861 or inner curved portion just before the step portion 862 and a second curved portion 863 or outer curved portion just after the step portion 862, as shown in FIG. 8. In other words, the first curved portion 861 and the second curved portion 863 are provided, respectively, at the beginning and end of a step portion 862. Such planes formed before and after a step portion facilitate the flattening of the Sn film 868.

The processes for forming the terminal electrode 860A (and other terminal electrode of the flange pair, not shown) including the flattened surface 864 is substantially the same as in the first embodiment, where a difference in the present process is a shape of the flange portion 840A.

As with the first embodiment, the radius of curvature of the first curved portion 861 and the second curved portion 863 can be the same for ease of manufacturing or different for greater degree of design freedom. In this example, the first curved portion 861 has a radius of curvature of R0.02 mm, which is smaller than the radius of curvature of R0.03 mm of the second curved portion 863.

Figure 9:
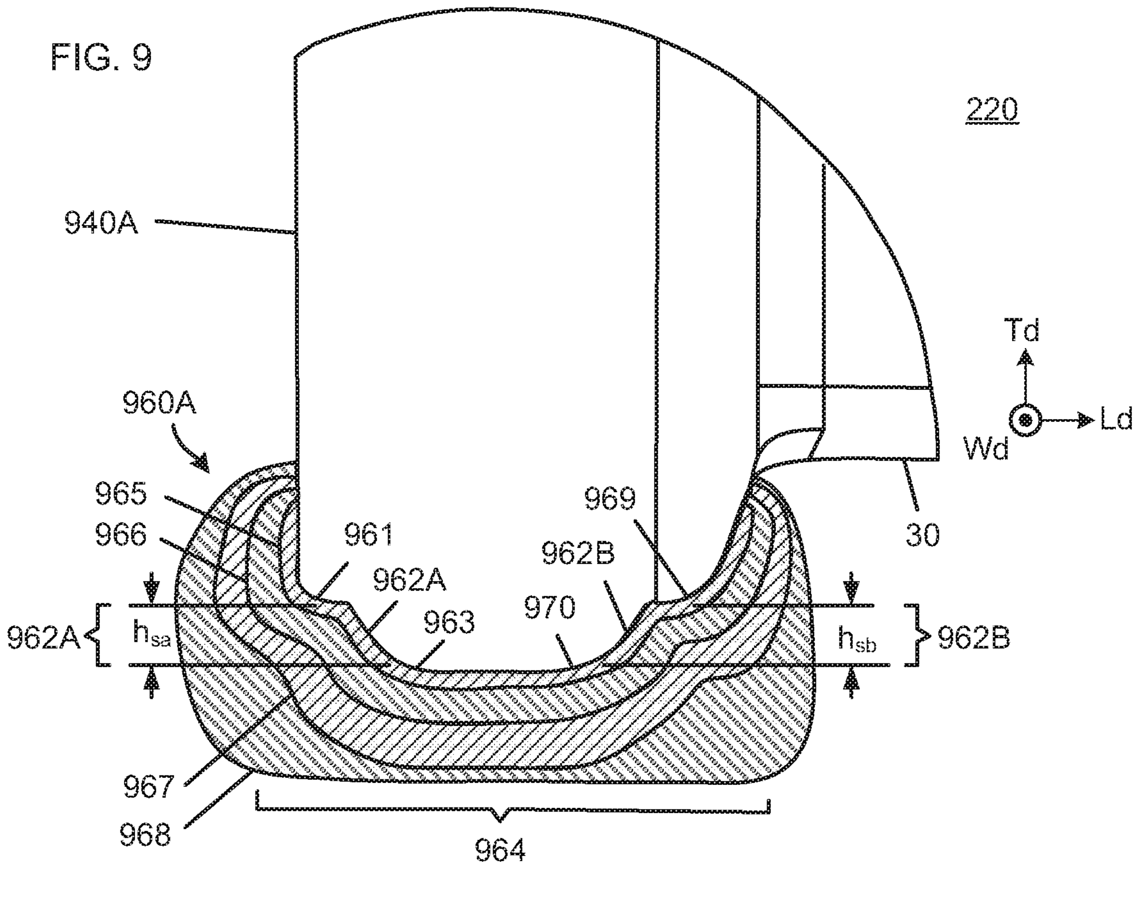
FIG. 9 is an enlarged cross sectional view of a portion of a coil component according to a third exemplary embodiment.

FIG. 9 is a diagram of a cross sectional view of a core portion of a coil component 220 according to a third exemplary embodiment. The portion of the core shown in FIG. 9 corresponds to the same area 100 of the drum core 12 shown in FIG. 1 and as viewed along line 4-4 in FIG. 3, but has a step configuration different from that of the FIG. 1 embodiment.

As shown in FIG. 9, the drum core includes a flange portion 940A at one end of the winding core 30. While not shown, it is to be understood that coil component 220 includes another flange portion having a structure substantially identical to flange portion 940A at the other end of the winding core 30 but facing in the negative length direction Ld.

With reference to FIG. 9, the flange portion 940A includes first and second step portions. The first step portion 962A is positioned on a side of the flange portion 940A opposite to the winding core 30 and has a step height $h_{sa}$ in the height direction Td from a bottom portion to a top portion thereof. The second step portion 962B is positioned on a same side of the flange portion 940A as the winding core 30 and has a step height $h_{sb}$ in the height direction Td from a bottom portion to a top portion thereof.

The terminal electrode 960A is formed to cover sides of the flange portion 940A including the first and second step portions 962A and 962B. The terminal electrode 960A includes plural metal layers including an innermost Ag thick film 965, a Ni film 966, a Cu film 967, and an outermost Sn film 968. The outermost Sn film 968 has a flattened surface 964 that is configured to be solder mounted on a mounting surface.

The Sn film 968 includes a first portion that is relatively thin in the height direction Td, a second portion positioned adjacent to one side of the first portion and relatively thick in the height direction Td compared with the first portion, and a third portion positioned adjacent to another side of the first portion and also relatively thick in the height direction Td compared with the first portion. The first, second, and third portions of the Sn film 968 include portions of the flattened surface 964, the first step portion 962A overlaps with the second portion of the Sn film 968 when seen in the height direction Td, and the second step portion 962B overlaps with the third portion of the Sn film 968 when seen in the height direction Td.

As shown in FIG. 9, the flange portion 940A includes a first curved portion 961 just before the step portion 962A, a second curved portion 963 just after the step portion 962A, a third curved portion 969 just before the step portion 962B, a fourth curved portion 970 just after the step portion 962B. In other words, the first curved portion 961 and the second curved portion 963 are provided, respectively, at the beginning and end of a step portion 962A, and the third curved portion 969 and the fourth curved portion 970 are provided, respectively, at the beginning and end of a step portion 962B. Such planes formed before and after a step portion facilitate the flattening of the Sn film 968.

The processes for forming the terminal electrode 960A (and other terminal electrode of the flange pair, not shown) including the flattened surface 964 is substantially the same as in the first and second embodiments, where a difference in the present process is a shape of the flange portion 940A.

As with the first and second embodiments, the radius of curvature of the first curved portion 961, the second curved portion 963, the third curved portion 969, and the fourth curved portion 970 can be the same for ease of manufacturing or different for greater degree of design freedom. In this example, the first curved portion 961, second curved portion 963, and the fourth curved portion 970 have a radius of curvature of R0.02 mm, which is smaller than the radius of curvature of R0.03 mm of the third curved portion 969.

Figure 10:
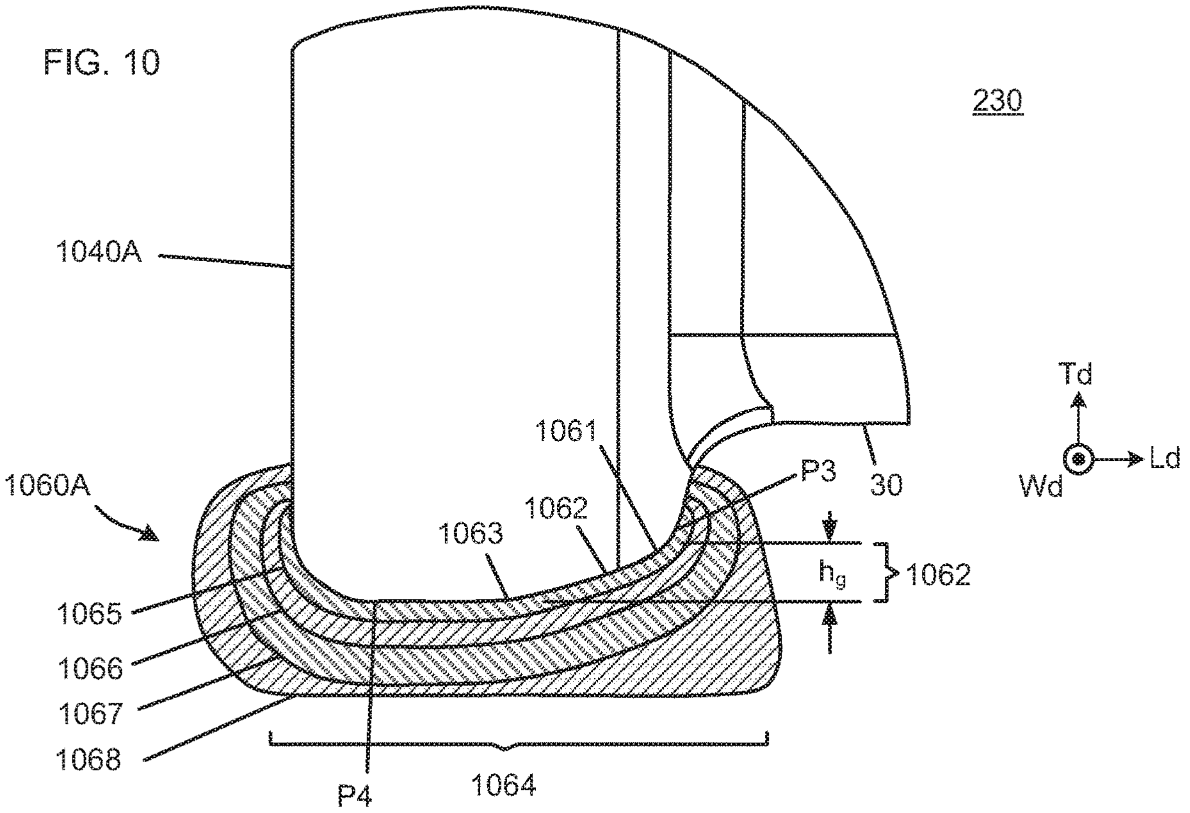
FIG. 10 is an enlarged cross sectional view of a portion of a coil component according to a fourth exemplary embodiment.

FIG. 10 is a diagram of a cross sectional view of a core portion of a coil component 230 according to a fourth exemplary embodiment. The portion of the core shown in FIG. 10 corresponds to the same area 100 of the drum core 12 shown in FIG. 1, but has a gradient configuration instead of the step configuration of the FIG. 1 embodiment.

As shown in FIG. 10, the drum core includes a flange portion 1040A at one end of the winding core 30. While not shown, it is to be understood that coil component 230 includes another flange portion having a structure substantially identical to flange portion 1040A at the other end of the winding core 30 but facing in the negative length direction Ld.

With reference to FIG. 10, the flange portion 1040A includes a gradient portion 1062 on the winding core side of the flange portion 1040A having a gradient height $h_g$ in the height direction Td from a bottom portion to a top portion thereof. The terminal electrode 1060A is formed to cover sides of the flange portion 1040A including the gradient portion 1062. The first flange portion 1040A has a first portion P3, a second portion P4, and at least one gradient portion 1062 between the first portion P3 and the second portion P4. A terminal electrode 1060A is provided on the step portion 1062 of the first flange portion 1040A, and a wire (not shown in FIG. 10) wound around the winding core portion 30 with a first end bonded to the terminal electrode. The terminal electrode 1060A includes plural metal layers, an outermost layer of which is an Sn film having a flattened mounting surface 1064, and the flattened mounting surface overlaps the first portion P3, the second portion P4 and the step portion 1062 when seen in a height direction Td perpendicular to the length direction Ld.

The terminal electrode 1060A can include plural metal layers including an innermost Ag thick film 1065, a Ni film 1066, a Cu film 1067, and an outermost Sn film 1068. The outermost Sn film 1068 has a flattened surface 1064 that is configured to be solder mounted on a mounting surface.

As shown in FIG. 10, the Sn film 1068 includes first portion that is relatively thin in the height direction Td and a second portion positioned adjacent to the first portion and relatively thick in the height direction Td compared with the first portion. Both the first and second portions of the Sn film 1068 include portions of the flattened surface 1064, and the gradient portion 1062 overlaps with the second portion of the Sn film 1068 when seen in the height direction Td.

The flange portion 1040A includes a first curved portion 1061 or inner curved portion just before the gradient portion 1062 and a second curved portion 1063 or outer curved portion just after the gradient portion 1062, as shown in FIG. 10. In other words, the first curved portion 1061 and the second curved portion 1063 are provided, respectively, at the beginning and end of a gradient portion 1062. Such planes formed before and after a gradient portion facilitate the flattening of the Sn film 1068.

The processes for forming the terminal electrode 1060A (and other terminal electrode of the flange pair, not shown) including the flattened surface 1064 is substantially the same as in the first embodiment, where a difference in the present process is a shape of the flange portion 1040A. Additionally, the Ni film 1066 and the Cu film 1067 retain a gradient shape after forming the flattened Sn film 1068.

As with the first to third embodiments, the radius of curvature of the first curved portion 1061 and the second curved portion 1063 can be the same for ease of manufacturing or different for greater degree of design freedom. In this example, both the first curved portion 1061 and the second curved portion 1063 have a radius of curvature of R0.04 mm.

Figure 11:
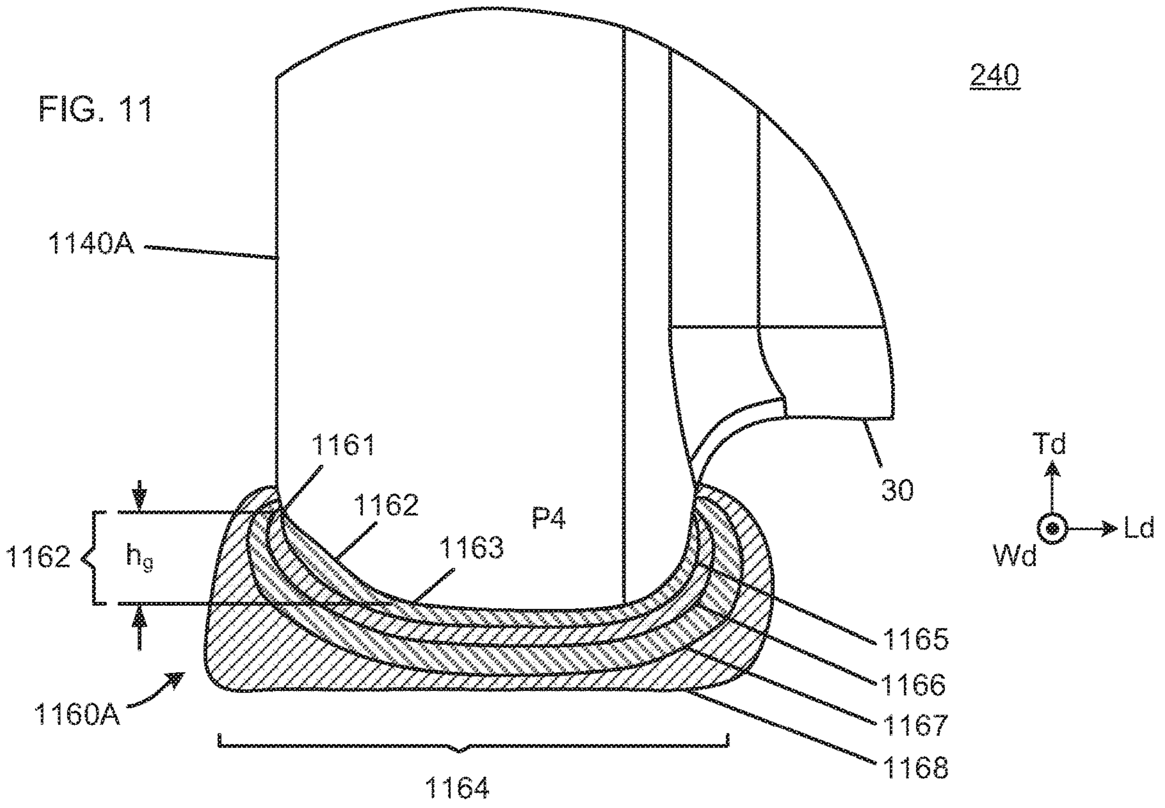
FIG. 11 is an enlarged cross sectional view of a portion of a coil component according to a fifth exemplary embodiment.

FIG. 11 is a diagram of a cross sectional view of a core portion of a coil component 240 according to a fifth exemplary embodiment. The portion of the core shown in FIG. 11 corresponds to the same area 100 of the drum core 12 shown in FIG. 1, but has a gradient configuration instead of the step configuration of the FIG. 1 embodiment.

More particularly, as shown in FIG. 11, a gradient portion 1162 is positioned on a side of a flange portion 1140A opposite to the winding core 30. While not shown, it is to be understood that coil component 240 includes another flange portion having a structure substantially identical to flange portion 1140A at the other end of the winding core 30 but facing in the negative length direction Ld.

With reference to FIG. 11, flange portion 1140A includes the gradient portion 1162 having a gradient height $h_g$ in the height direction Td from a bottom portion to a top portion thereof. A terminal electrode 1160A is formed to cover sides of the flange portion 1140A including the gradient portion 1162. The terminal electrode 1160A includes plural metal layers including an innermost Ag thick film 1165, a Ni film 1166, a Cu film 1167, and an outermost Sn film 1168. The outermost Sn film 1168 has a flattened surface 1164 that is configured to be solder mounted on a mounting surface.

The Sn film 1168 includes first portion that is relatively thin in the height direction Td and a second portion positioned adjacent to the first portion and relatively thick in the height direction Td compared with the first portion. Both the first and second portions of the Sn film 1168 include portions of the flattened surface 1164, and the gradient portion 1162 overlaps with the second portion of the Sn film 1168 when seen in the height direction Td.

The flange portion 1140A includes a first curved portion 1161 just before the gradient portion 1162 and a second curved portion 1163 just after the gradient portion 1162, as shown in FIG. 11. In other words, the first curved portion 1161 and the second curved portion 1163 are provided, respectively, at the beginning and end of a gradient portion 1162. Such planes formed before and after a gradient portion facilitate the flattening of the Sn film 1168.

The processes for forming the terminal electrode 1160A (and other terminal electrode of the flange pair, not shown) including the flattened surface 1164 is substantially the same as in the first embodiment, where a difference in the present process is a shape of the flange portion 1140A.

As with the first to fourth embodiments, the radius of curvature of the first curved portion 1161 and the second curved portion 1163 can be the same for ease of manufacturing or different for greater degree of design freedom. In this example, the first curved portion 1161 and the second curved portion 1163 have and equal radius of curvature of R0.04 mm.

Figure 12:
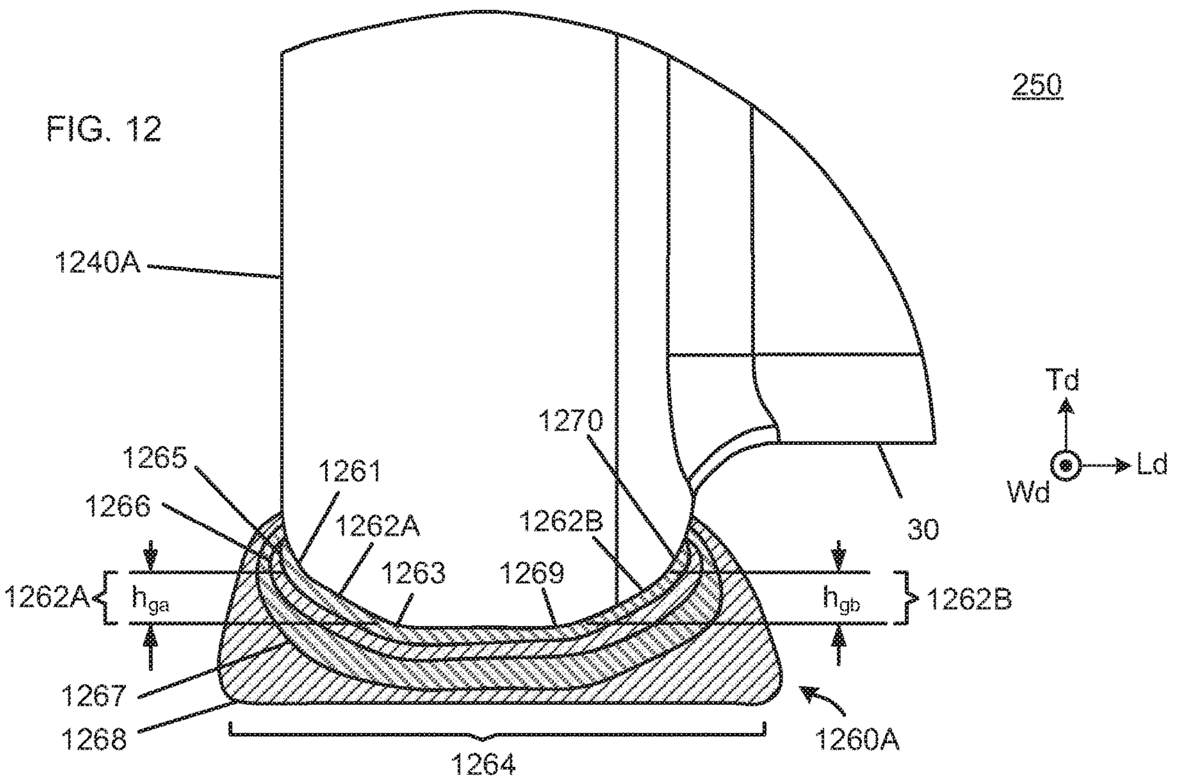
FIG. 12 is an enlarged cross sectional view of a portion of a coil component according to a sixth exemplary embodiment.

FIG. 12 is a diagram of a cross sectional view of a core portion of a coil component 250 according to a sixth exemplary embodiment. The portion of the core shown in FIG. 12 corresponds to the same area 100 of the drum core 12 shown in FIG. 1, but has a gradient configuration instead of the step configuration of the FIG. 1 embodiment.

As shown in FIG. 12, the drum core includes a flange portion 1240A at one end of the winding core 30. While not shown, it is to be understood that coil component 250 includes another flange portion having a structure substantially identical to flange portion 1240A at the other end of the winding core 30 but facing in the negative length direction Ld.

With reference to FIG. 12, the flange portion 1240A includes first and second gradient portions. The first gradient portion 1262A is positioned on a side of the flange portion 1240A opposite to the winding core 30 and has a gradient height $h_{ga}$ in the height direction Td from a bottom portion to a top portion thereof. The second gradient portion 1262B is positioned on a same side of the flange portion 1240A as the winding core 30 and has a gradient height $h_{gb}$ in the height direction Td from a bottom portion to a top portion thereof.

The terminal electrode 1260A is formed to cover sides of the flange portion 1240A including the first and second gradient portions 1262A and 1262B. The terminal electrode 1260A includes plural metal layers including an innermost Ag thick film 1265, a Ni film 1266, a Cu film 1267, and an outermost Sn film 1268. The outermost Sn film 1268 has a flattened surface 1264 that is configured to be solder mounted on a mounting surface.

The Sn film 1268 includes first portion that is relatively thin in the height direction Td, a second portion positioned adjacent to one side of the first portion and relatively thick in the height direction Td compared with the first portion, and a third portion positioned adjacent to another side of the first portion and also relatively thick in the height direction Td compared with the first portion. The first, second, and third portions of the Sn film 1268 include portions of the flattened surface 1264, the first gradient portion 1262A overlaps with the second portion of the Sn film 1268 when seen in the height direction Td, and the second gradient portion 1262B overlaps with the third portion of the Sn film 1268 when seen in the height direction Td.

As shown in FIG. 12, the flange portion 1240A includes a first curved portion 1261 just before the gradient portion 1262A, a second curved portion 1263 just after the gradient portion 1262A, a third curved portion 1269 just before the gradient portion 1262B, a fourth curved portion 1270 just after the gradient portion 1262B. In other words, the first curved portion 1261 and the second curved portion 1263 are provided, respectively, at the beginning and end of a gradient portion 1262A, and the third curved portion 1269 and the fourth curved portion 1270 are provided, respectively, at the beginning and end of a gradient portion 1262B. Such planes formed before and after a gradient portion facilitate the flattening of the Sn film 1268.

The processes for forming the terminal electrode 1260A (and other terminal electrode of the flange pair, not shown) including the flattened surface 1264 is substantially the same as in the first and second embodiments, where a difference in the present process is a shape of the flange portion 1240A.

As with the first to fifth embodiments, the radius of curvature of the first curved portion 1261, the second curved portion 1263, the third curved portion 1269, and the fourth curved portion 1270 can be the same for ease of manufacturing or different for greater degree of design freedom. In this example, the first curved portion 1261, second curved portion 1263, the third curved portion 1269, and the fourth curved surface 1270 all have a radius of curvature of R0.04 mm.

Figure 13:
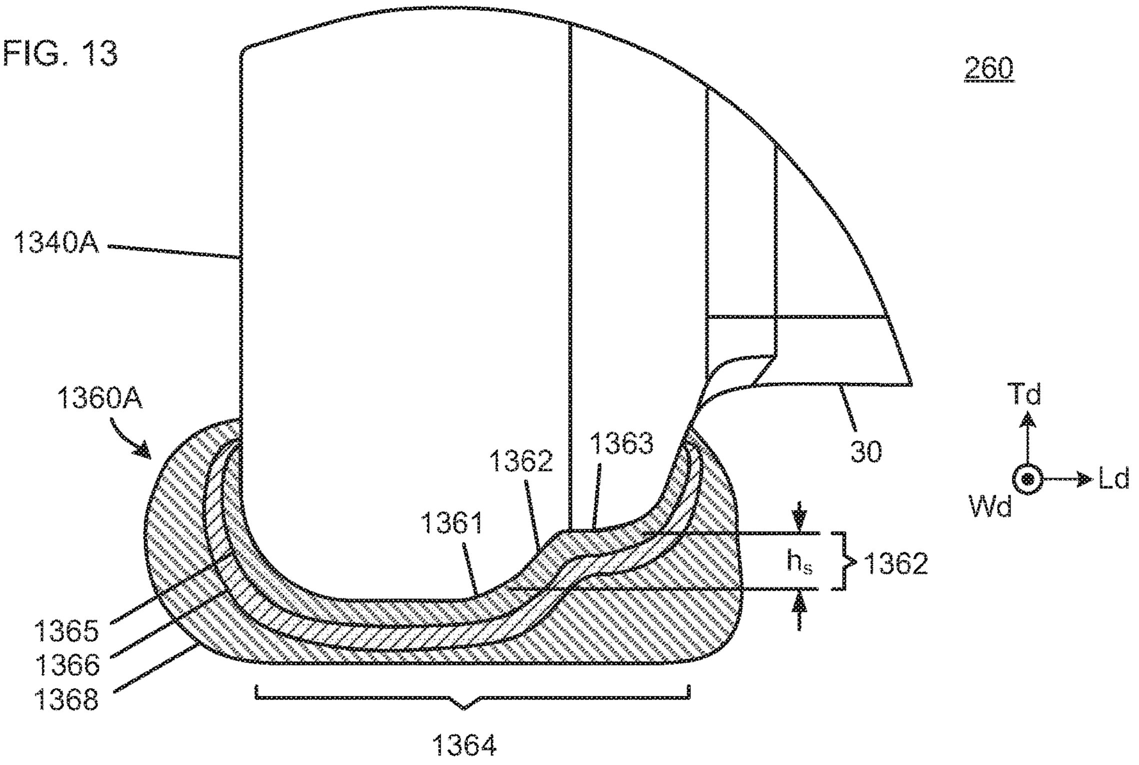
FIG. 13 is an enlarged cross sectional view of a portion of a coil component according to a seventh exemplary embodiment.

FIG. 13 is a diagram of a cross sectional view of a core portion of a coil component 250 according to a seventh exemplary embodiment. The seventh embodiment is similar to the first embodiment, but is different in that metallization of terminal electrode 1360A on the flange portion 1340A does not include a Cu film.

While FIG. 13 shows a step portion 1362 positioned on a winding core portion side of a flange portion 1340A, a gradient portion can be used in place of the step portion, and any of the above step or gradient arrangements can utilize the Ag/Ni/Sn terminal metallization disclosed hereafter. While not shown, it is to be understood that coil component 260 includes another flange portion having a structure substantially identical to flange portion 1340A at the other end of the winding core 30 but facing in the negative length direction Ld.

With reference to FIG. 13, step portion 1362 has a step height $h_s$ in the height direction Td from a bottom portion to a top portion thereof. The terminal electrode 1360A is formed to cover sides of the flange portion 1340A including the step portion 1362. The terminal electrode 1360A includes plural metal layers including an innermost Ag thick film 1365, a Ni film 1366, and an outermost Sn film 1368. The outermost Sn film 1368 has a flattened surface 1364 that is configured to be solder mounted on a mounting surface.

The Sn film 1368 includes first portion that is relatively thin in the height direction Td and a second portion positioned adjacent to the first portion and relatively thick in the height direction Td compared with the first portion. Both the first and second portions of the Sn film 1368 include portions of the flattened surface 1364, and the step portion 1362 overlaps with the second portion of the Sn film 1368 when seen in the height direction Td. As with other exemplary embodiments described herein, step portion 1362 is preceded by a first curved portion 1361 or inner curved portion just before the gradient portion 1362 and a second curved portion 1363 or outer curved portion just after the gradient portion 1362, as shown in FIG. 13. In other words, the first curved portion 1361 and the second curved portion 1363 are provided, respectively, at the beginning and end of a gradient portion 1362.

In the first to sixth embodiments, a Cu layer is utilized in the terminal electrodes to prevent Cu elution to a solder from the Cu wire 32, but the Cu layer may not be needed.

It is to be understood that the same Ag/Ni/Sn terminal electrode metallization of the seventh embodiment can be applied to any of the exemplary embodiments described herein.

A method of manufacturing the coil component 260 according to the seventh embodiment is substantially the same as described above, except the electroplating processes do not include a Cu plating step, and the Sn film 1368 is plated directly on the Ni film 1366.

Figure 14:
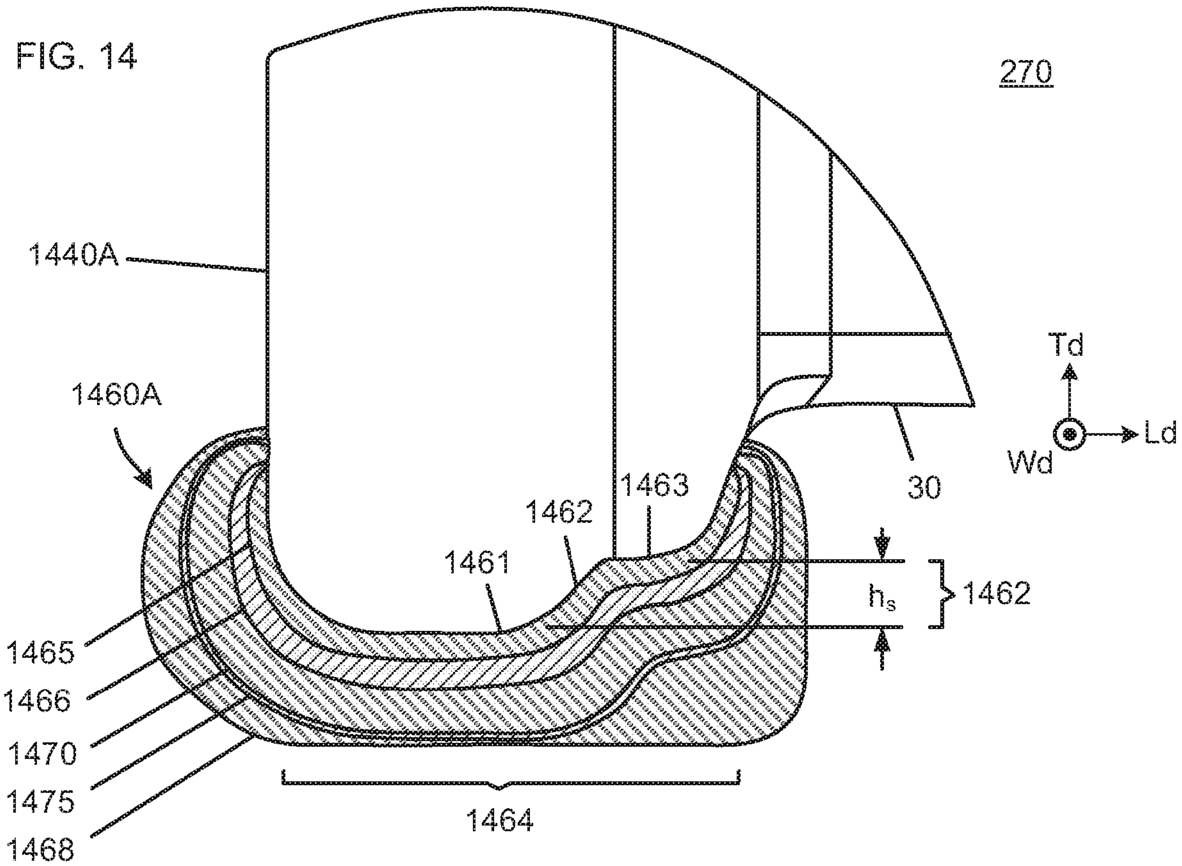
FIG. 14 is an enlarged cross sectional view of a portion of a coil component according to an eighth exemplary embodiment.
Figure 15:
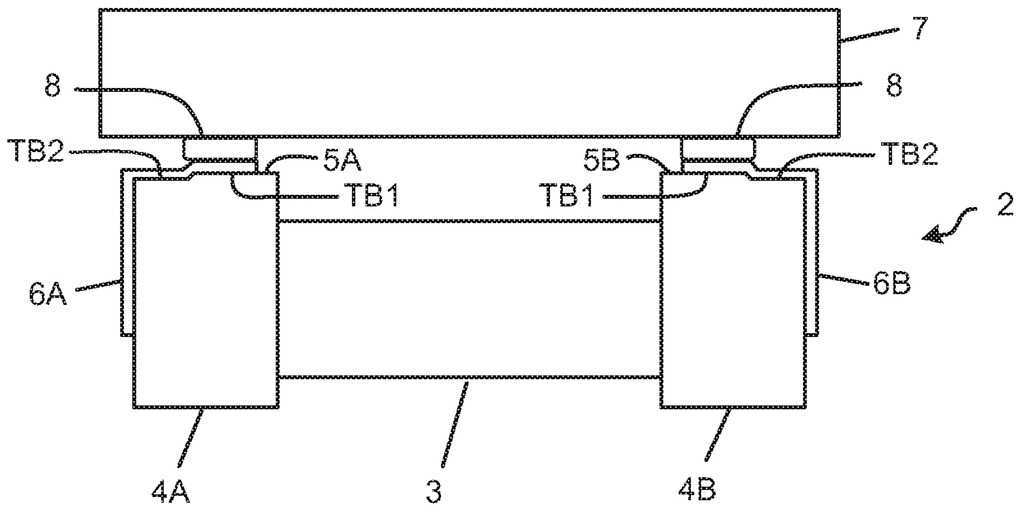
FIG. 15 Prior Art
FIG. 15 illustrates a conventional coil component.

FIG. 14 is a diagram of a cross sectional view of a core portion of a coil component 270 according to an eighth exemplary embodiment. The portion of the core shown in FIG. 14 corresponds to the same area 100 of the drum core 12 shown in FIG. 1, but has a terminal electrode metallization configuration different from that of the FIG. 1 embodiment.

The eighth embodiment is similar to the first embodiment, but is different in that metallization of terminal electrode 1460A on the flange portion 1440A additionally includes an alloy film containing Cu and Sn.

While FIG. 14 shows a step portion 1462 positioned on a winding core portion side of a flange portion 1440A, a gradient portion can be used in place of the step portion, and any of the above step or gradient arrangements can utilize the Ag/Ni/alloy/Sn terminal metallization disclosed hereafter.

With reference to FIG. 14, the step portion 1462 has a step height $h_s$ in the height direction Td from a bottom portion to a top portion thereof. The terminal electrode 1460A is formed to cover sides of the flange portion 1440A including the step portion 1462. The terminal electrode 1460A includes plural metal layers including an innermost Ag thick film 1465, a Ni film 1466, a Cu layer 1470, an alloy film 1475 including Ni and Sn, and an outermost Sn film 1468. The outermost Sn film 1468 has a flattened surface 1464 that is configured to be solder mounted on a mounting surface. As with other exemplary embodiments described herein, step portion 1462 is preceded by a first curved portion 1461 or inner curved portion just before the step portion 1462 and a second curved portion 1463 or outer curved portion just after the step portion 1462, as shown in FIG. 14. In other words, the first curved portion 1461 and the second curved portion 1463 are provided, respectively, at the beginning and end of a gradient portion 1462.

Embodiments 1, 4, 7 and 8 each have a step or gradient of each flange on the winding core side of the flange. With such a configuration, the posture of the coil component at the time of mounting is stabilized because the center of gravity of the flange approaches the outside.

Embodiments 2 and 5 each have a step or gradient of each flange on the side of the flange opposite to the winding core portion side of the flange. With such a configuration, since the wire can be crimped inside the flange, it is possible to reduce the Rdc. Further, since an acute angle would be present in the direction of pulling out of the wire in these configurations, it is easy to provide tension to the wire, and thus suppress the occurrence of burrs during wire cutting.

In embodiments 3 and 6, where each flange has plural steps or gradients, one step or gradient on a winding core portion side of the flange and another step or gradient on a side of the flange opposite the winding core portion side, the above effects the stabilizing the posture of the coil component at the time of mounting, reducing Rdc, and providing tension to the wire at an acute angle can be balanced.

The preferred embodiments described above are provided for facilitating understanding the disclosure, but are not intended to be exhaustive or to limit the disclosure to the precise forms disclosed. Modifications and/or improvements may be made to the disclosure without departing from the scope and spirit of the disclosure, and equivalents of the disclosure are also encompassed in the disclosure. That is, suitable design changes made to the preferred embodiments by those skilled in the art are also encompassed in the disclosure as long as they are within the scope and spirit of the disclosure. For example, the elements of the preferred embodiments and the positions, materials, conditions, configurations, and sizes thereof are not restricted to those described in the embodiments and may be changed in an appropriate manner.

While exemplary embodiments of the disclosure have been described above, it is to be understood that variations and modifications will be apparent to those skilled in the art without departing from the scope and spirit of the disclosure. The scope of the disclosure, therefore, is to be determined solely by the following claims.

What is claimed is:

1. A coil component comprising:

a drum core including a winding core portion extending in a first direction and a pair of flange portions provided at both ends of the winding core portion, at least one flange of the pair of flange portions having a step, an inner curved surface portion adjacent to the step and an outer curved surface portion adjacent to the step such that the inner curved surface portion and the outer curved surface portion are provided, respectively, at a beginning and an end of the step;

a terminal electrode provided on the step; and a wire wound around the winding core portion with an end bonded to the terminal electrode, wherein the terminal electrode includes plural metal layers, an outermost layer of which is an Sn film having a flattened mounting surface, and the flattened mounting surface overlaps the step when seen in a second direction perpendicular to the first direction.

2. The coil component of claim 1, wherein a width of the flattened mounting surface along the first direction is ½ or more of the total width of the at least one flange.

3. The coil component according to claim 1, wherein a height of the step in the second direction is 40 μm or less.

4. The coil component according to claim 1, wherein the at least one flange includes the inner curved surface portion on a winding core portion side of the step and the outer curved surface portion on another side of the step.

5. The coil component according to claim 4, wherein a radius of curvature of the inner and outer curved surface portions are different.

6. The coil component according to claim 5, wherein the radius of curvature of the inner curved surface portion is greater than the radius of curvature of the outer curved surface portion.

7. The coil component according to claim 5, wherein the radius of curvature of the inner curved surface portion is equal to the radius of curvature of the outer curved surface portion.

8. The coil component according to claim 1, wherein a length of the flattened mounting surface in the first direction is 30 μm or less.

9. The coil component according to claim 1, wherein the step of the at least one flange is on a winding core side of the at least one flange.

10. The coil component according to claim 1, wherein the step of the at least one flange is on a side of the flange opposite to the winding core portion.

11. The coil component according to claim 1, wherein the step of the at least one flange includes plural steps, with one of the steps on a winding core portion side of the flange and another of the steps on a side of the flange opposite the winding core portion side.

12. The coil component according to claim 1, wherein the plural metal layers of the terminal electrode include Ni/Cu plating, and a surface of the Ni/Cu plating substantially has a shape of the step.

13. A coil component comprising:

a drum core including a winding core portion extending in a first direction and a first flange portion and a second flange portion provided at both ends of the winding core portion, the first flange portion having a first portion and a second portion, wherein a step, an inner curved surface portion, and an outer curved surface portion are between the first portion and second portion, wherein the inner curved surface portion is adjacent to the step and the outer curved surface portion is adjacent to the step such that the inner curved surface portion and the outer curved surface portion are provided, respectively, at a beginning and an end of the step;

a terminal electrode provided on the step of the first flange portion; and a wire wound around the winding core portion with an end of the wire bonded to the terminal electrode, wherein the terminal electrode includes plural metal layers, an outermost layer of which is an Sn film having a flattened mounting surface, and the flattened mounting surface overlaps the first portion, the second portion and the step when seen in a second direction perpendicular to the first direction.

* * * * *